(12) United States Patent
Ohkoshi

(10) Patent No.: US 8,681,287 B2
(45) Date of Patent: Mar. 25, 2014

(54) LIQUID CRYSTAL DISPLAY DEVICE HAVING POLARIZING PLATE BEING PROVIDED IN A PARTICULAR CASING

(75) Inventor: Toru Ohkoshi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 130 days.

(21) Appl. No.: 13/394,522

(22) PCT Filed: Aug. 19, 2010

(86) PCT No.: PCT/JP2010/063968
§ 371 (c)(1),
(2), (4) Date: Mar. 6, 2012

(87) PCT Pub. No.: WO2011/033893
PCT Pub. Date: Mar. 24, 2011

(65) Prior Publication Data
US 2012/0162571 A1    Jun. 28, 2012

(30) Foreign Application Priority Data

Sep. 16, 2009 (JP) ................. 2009-213971

(51) Int. Cl.
*G02F 1/1333* (2006.01)
*H02B 1/015* (2006.01)
(52) U.S. Cl.
USPC ........................................... 349/58; 361/644
(58) Field of Classification Search
USPC ..................... 349/58; 361/681, 644
See application file for complete search history.

(56) References Cited

U.S. PATENT DOCUMENTS 6,411,216 B1 *   6/2002   Fukushima et al. ....... 340/815.4

FOREIGN PATENT DOCUMENTS

| JP | 04-065319 U | 6/1992 |
| JP | 10-214036 A | 8/1998 |
| JP | 11-240355 A | 9/1999 |
| JP | 2001-260168 A | 9/2001 |
| JP | 2005-291718 A | 10/2005 |
| JP | 2009-103770 A | 5/2009 |

* cited by examiner

*Primary Examiner* — Mike Qi
(74) *Attorney, Agent, or Firm* — McDermott Will & Emery LLP

(57) ABSTRACT

Disclosed is a liquid crystal display device wherein display contents of a liquid crystal display can be excellently viewed. The liquid crystal display device (1) is provided with: a casing (6) which houses the liquid crystal display (2) provided with polarization plates (2c, 2d) on the front side and the rear side; and a see-through plate (7) which covers the front opening of the casing (6) and is composed of a synthetic resin. The see-through plate (7) is provided with a side wall (7a) such that the side wall surrounds the outer side of the end portion of the front opening of the casing (6), and on an area at a distance from a region where the liquid crystal display (2) is viewed, said area being on the side wall (7a), a gate port (7c) is provided when the see-through plate (7) is formed of the resin. Thus, even if the display contents of the liquid crystal display (2) are viewed through polarization glasses, light is transmitted since refractive-index anisotropy due to the formation is not generated in the area at a distance from the gate port (7c), by providing the gate port (7c) on the side wall (7a) area of the see-through plate (7), and the display contents of the liquid crystal display (2) can be excellently viewed.

6 Claims, 7 Drawing Sheets

LIQUID CRYSTAL DISPLAY DEVICE HAVING POLARIZING PLATE BEING PROVIDED IN A PARTICULAR CASING

RELATED APPLICATIONS

This application is the U.S. National Phase under 35 U.S.C. §371 of International Application No. PCT/JP2010/063968, filed on Aug. 19, 2010, which in turn claims the benefit of Japanese Application No. 2009-213971, filed on Sep. 16, 2009, the disclosures of which Applications are incorporated by reference herein.

TECHNICAL FIELD

The present invention relates to a liquid crystal display device mounted on a special vehicle such as a construction machine, ships, or cars, for example, and performs illumination and display in a liquid crystal display with light rays applied from a light source.

BACKGROUND ART

A conventionally known liquid crystal display device for cars or the like includes a liquid crystal display having a liquid crystal sealed in between a pair of glass substrates and also having a polarizing plate provided on each of a front side and a rear side of the glass substrates, a circuit substrate having a driving circuit mounted thereon for driving the liquid crystal display, a light source mounted on the circuit substrate and illuminating the liquid crystal display for realizing display, a casing housing the liquid crystal display and the light source, and a see-through plate made of synthetic resin, covering an opening portion on the front of the casing, protecting the liquid crystal display, preventing entry of dust from the outside to the inside of the casing, and allowing excellent visibility of the liquid crystal display. (See, for example, Patent Document 1 and Patent Document 2)

Such a see-through plate made of synthetic resin typically has the advantages of high strength and easy molding in molding even when it has a complicated shape. For example, a polycarbonate resin or an acrylic resin having a transmission property is used. This provides the advantage that the see-through plate covering the front side of the casing can be easily molded from the synthetic resin material even when it has a complicated shape. It is also known that, even when an observer wears polarizing glasses, the use of the polycarbonate resin or the acrylic resin allows favorable visual recognition of practically required display contents on the liquid crystal display through the use of the see-through plate (the substrate made of the synthetic resin) of a polymer material serving as a polarization-property relieving plate which relieves the polarization property on the front side of the liquid crystal display 2.

PRIOR ART REFERENCE

Patent Documents
  Patent Document 1: JP-A-4-65319
  Patent Document 2: JP-A-10-214036

DISCLOSURE OF THE INVENTION

Problems that the Invention is to Solve

In liquid crystal display devices described in Patent Document 1 and Patent Document 2 mentioned above, since some areas of a protecting cover (see-through plate) placed on the front side of the liquid crystal display may have resin molecules oriented nonuniformly near a gate port in molding the resin of the see-through plate serving as the protecting cover, the areas may be seen through polarizing glasses in a visible range of a liquid crystal display portion. When the liquid crystal display is seen through the polarizing glasses, a black shadow may partially appear in the presence of the disorder of the orientation direction of the molecules in the visible range due to molding stress, which may prevent reading of display. In other words, anisotropy of refractive index occurs near the gate port due to the molding stress portion produced from the molding, and as a result, when the display is seen through the polarizing glasses, a partially black area coinciding with a direction orthogonal to the polarization axis of the polarizing glasses may be found.

To address this, it is an object of the present invention to provide a liquid crystal display device capable of favorable visual recognition of display contents on a liquid crystal display by providing a gate port in molding of resin of a see-through plate serving as a protecting cover at a position located at a distance from an area where the liquid crystal display is visually recognized when the resin of the see-through plate is molded.

Means for Solving the Problems

To solve the problems described above, the present invention provides, in claim 1, a liquid crystal display device including a liquid crystal display including a liquid crystal sealed in between a pair of glass substrates and including a polarizing plate provided on each of a front side and a rear side of the glass substrate, a casing housing the liquid crystal display, and a see-through plate made of synthetic resin, covering an opening portion on a front of the casing, and provided for visual recognition of a display portion area of the liquid crystal display, characterized in that the see-through plate is provided with a side wall extending continuously from an area for visually recognizing the liquid crystal display so as to surround an outside of an end portion of the opening portion on the front of the casing, and the side wall is provided with a gate port in molding of a resin of the see-through plate at a position located at a distance from the area for visually recognizing the liquid crystal display.

With this configuration, when the display contents on the liquid crystal display device are to be seen through polarizing glasses, the gate port provided at the position of the side wall of the see-through plate at a distance from the visible range of the liquid crystal display portion causes anisotropy of refractive index due to molding stress produced in molding only near the gate port, and as a result, a portion partially appearing black occurs only in the portion of the side wall of the see-through plate that coincides with a direction orthogonal to the polarization axis of the polarizing glasses when the display is seen through the polarizing glasses. However, light passes through the other portion at a distance from the gate port since the anisotropy of refractive index due to the molding is not produced (no limitation in direction), and thus the display contents on the liquid crystal display can be favorably recognized visually when they are seen through the polarizing glasses.

In claim 2, the liquid crystal display device according to claim 1 is characterized in that the side wall is provided with a protruding portion at a position located at a distance from the area for visually recognizing the liquid crystal display, and the gate port in molding of the resin of the see-through plate is provided at a position of the protruding portion.

Since the protruding portion is provided at the position located at a distance from the area for visually recognizing the liquid crystal display, and the gate port in molding of the resin of the see-through plate is provided at the position of the protruding portion, a portion partially appearing black occurs only in the position of the protruding portion protruding from the side wall of the see-through plate and the portion of the side wall that coincide with the direction orthogonal to the polarization axis of the polarizing glasses when the display is seen through the polarizing glasses. However, light passes through the other portion at a distance from the gate port, or on the front side of the see-through plate, since the anisotropy of refractive index due to the molding is not produced (no limitation in direction), and thus the display contents on the liquid crystal display can be favorably recognized visually when they are seen through the polarizing glasses.

In claim 3, the liquid crystal display device according to claim 2 is characterized in that the protruding portion protruding from the side wall provided with the gate port is formed in a generally trapezoidal shape tapered with the gate port as a base point.

The formation of the side wall of the see-through plate formed in the generally trapezoidal shape tapered with the gate port as the base point allows favorable resin fluidity in the molding of the synthetic resin material. As a result, the molding stress in the resin molding can be relieved to reduce the size of the area having anisotropy of refractive index due to the molding stress. When the display is seen through the polarizing glasses, a portion partially appearing black is only the narrow area of the side wall of the see-through plate coinciding with the direction orthogonal to the polarization axis of the polarizing glasses. Light passes through the see-through plate located on the front side of the liquid crystal display since the anisotropy of refractive index due to the molding is not produced (no limitation in direction), and thus the display contents on the liquid crystal display can be favorably recognized visually.

In claim 4, the liquid crystal display device according to any one of claims 1 to 3 is characterized in that a dust-preventative rib is formed to protrude opposite to a position of an end portion of the side wall and integrally with the casing.

The dust-preventative rib formed opposite to the position of the end portion of the side wall of the see-through plate and integrally with the casing can prevent entry of dust from the gap portion serving as the boundary between the side wall provided for the see-through plate and the casing.

In claim 5, the liquid crystal display device according to any one of claims 1 to 4 is characterized in that the see-through plate is colored and molded.

With the configuration, the color of the display portion of the liquid crystal display device transmitted through the see-through plate is entirely illuminated through the color of the see-through plate, and the liquid crystal display device is placed at a position behind the see-through plate, so that a sense of greater depth and a three-dimensional appearance can be enhanced.

In claim 6, the liquid crystal display device according to any one of claims 1 to 5 is characterized in that the area for visually recognizing the liquid crystal display on the front side of the see-through plate is formed in an arc curved shape.

With this configuration, even when light rays incident from outside are reflected, the light rays can be directed other than a line-of-vision direction without being directed to a line-of-vision direction of an observer by the formation of the surface on the front side of the see-through plate in the arc curved shape, so that the liquid crystal display device can be provided with no confusion and excellent visibility.

Advantage of the Invention

As described above, according to the present invention, the intended object can be achieved. Even when the display contents on the liquid crystal display device are seen through the polarizing glasses, the gate port provided at the position of the side wall of the see-through plate at a distance from the visible range of the liquid crystal display portion causes no anisotropy of refractive index due to molding at a position located at a distance from the gate port (no limitation in direction), so that light passes through the position and thus the display contents on the liquid crystal display can be favorably recognized visually when they are seen through the polarizing glasses.

BEST MODE FOR CARRYING OUT THE INVENTION

A liquid crystal display device according to the present invention is described in detail with an example of a liquid crystal display device used for a vehicle. In the following, embodiments of the present invention are described with reference to the drawings.

Embodiment 1

Figure 1:
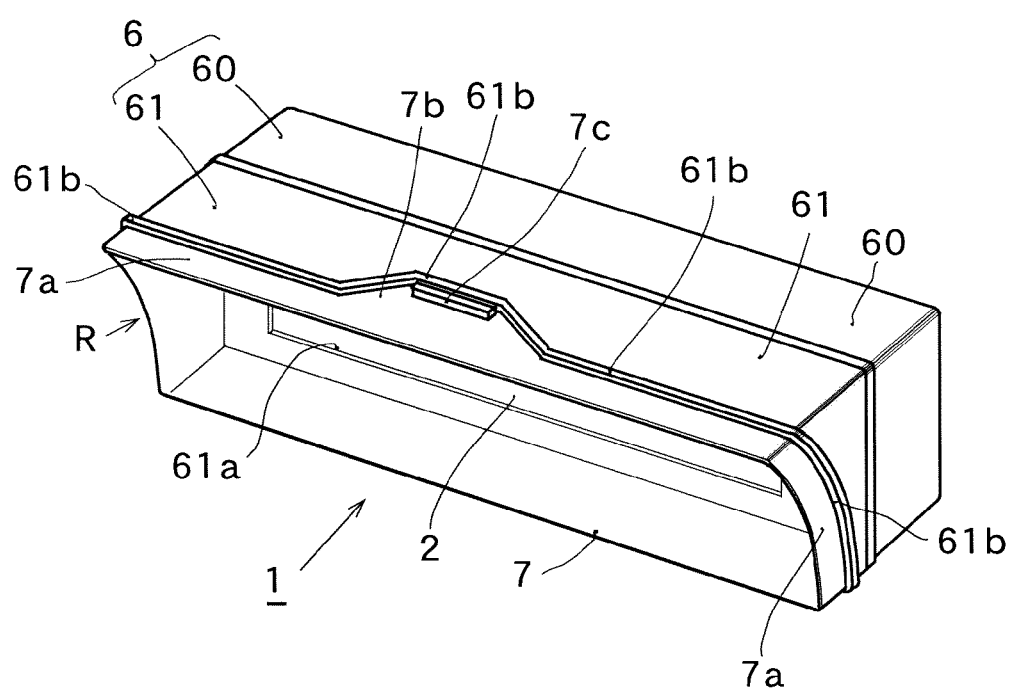
FIG. 1 A perspective view showing the overall liquid crystal display device which is a first embodiment of the present invention.
Figure 2:
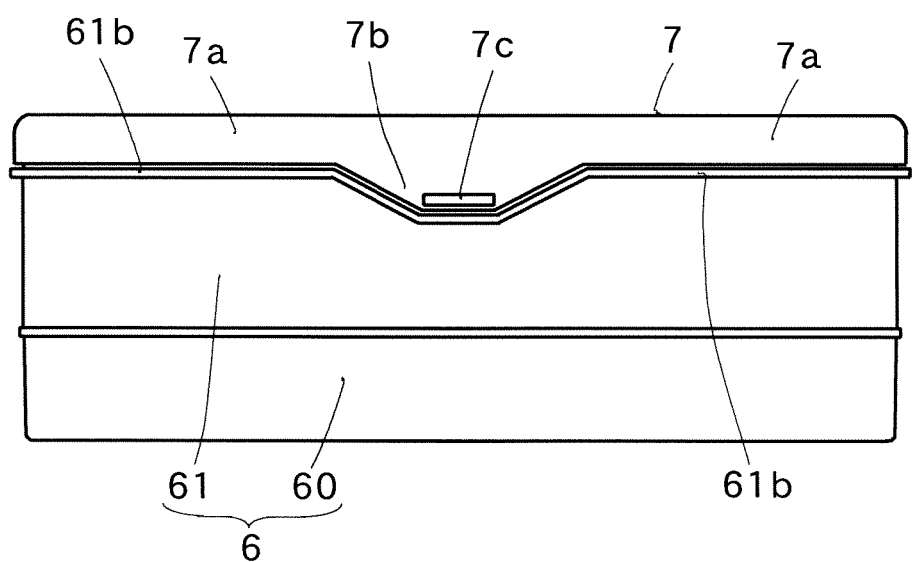
FIG. 2 A plan view of the liquid crystal display device showing the position of a gate port in FIG. 1.
Figure 3:
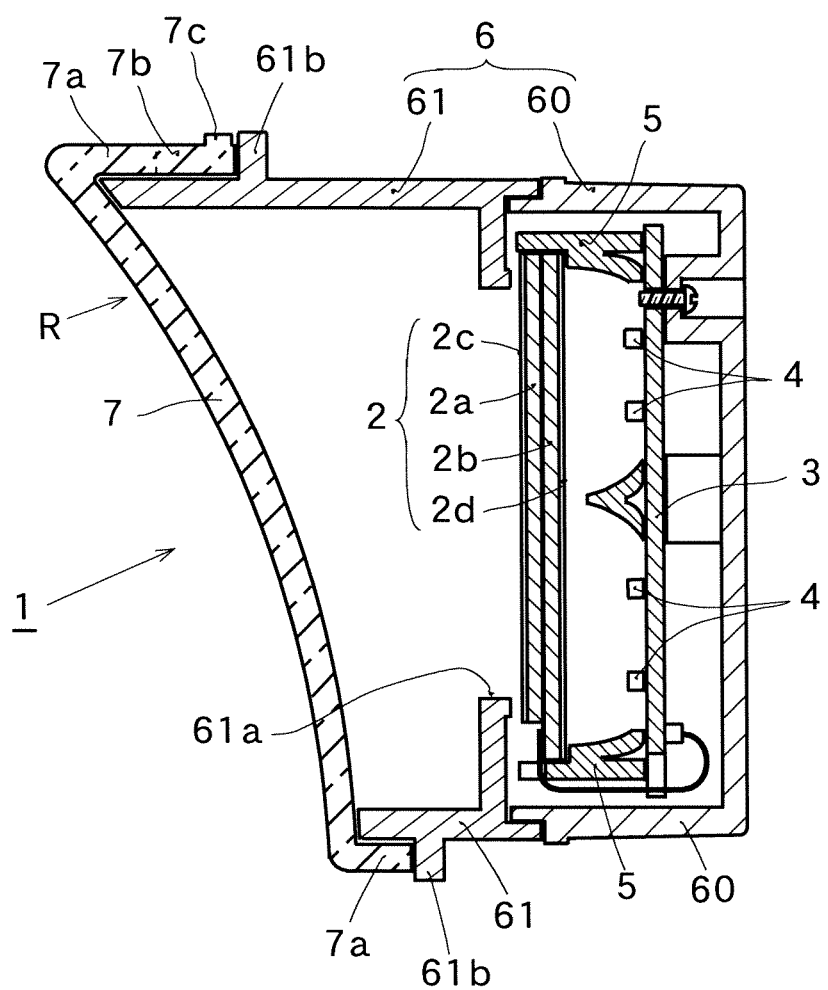
FIG. 3 An enlarged section view showing main portions in FIG. 1.
Figure 4:
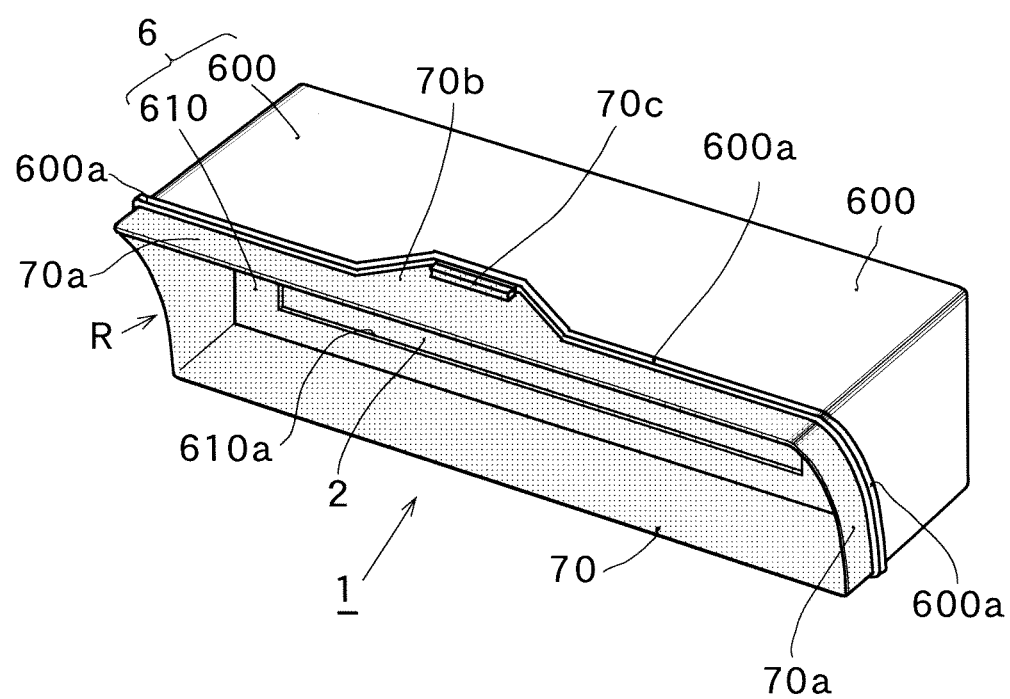
FIG. 4 A perspective view showing the overall liquid crystal display device which is a second embodiment of the present invention.
Figure 5:
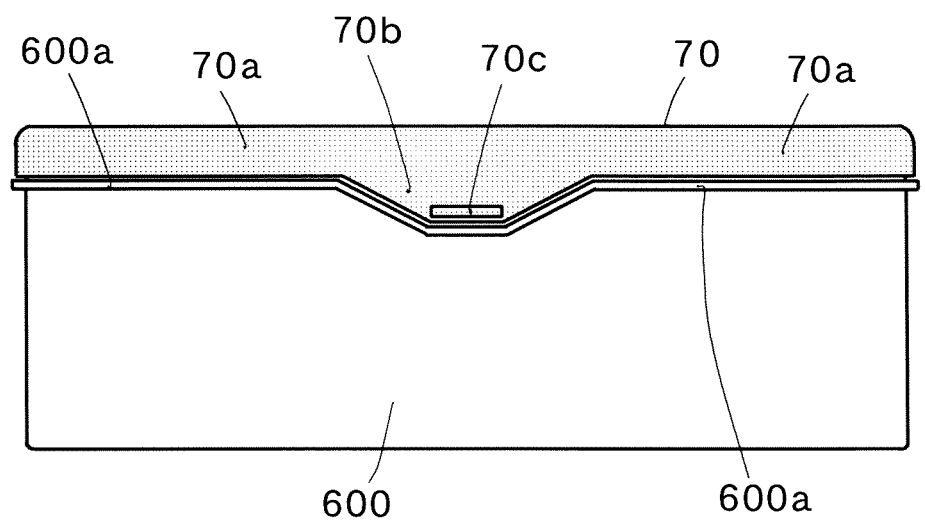
FIG. 5 A plan view of the liquid crystal display device showing the position of a gate port in FIG. 4.
Figure 6:
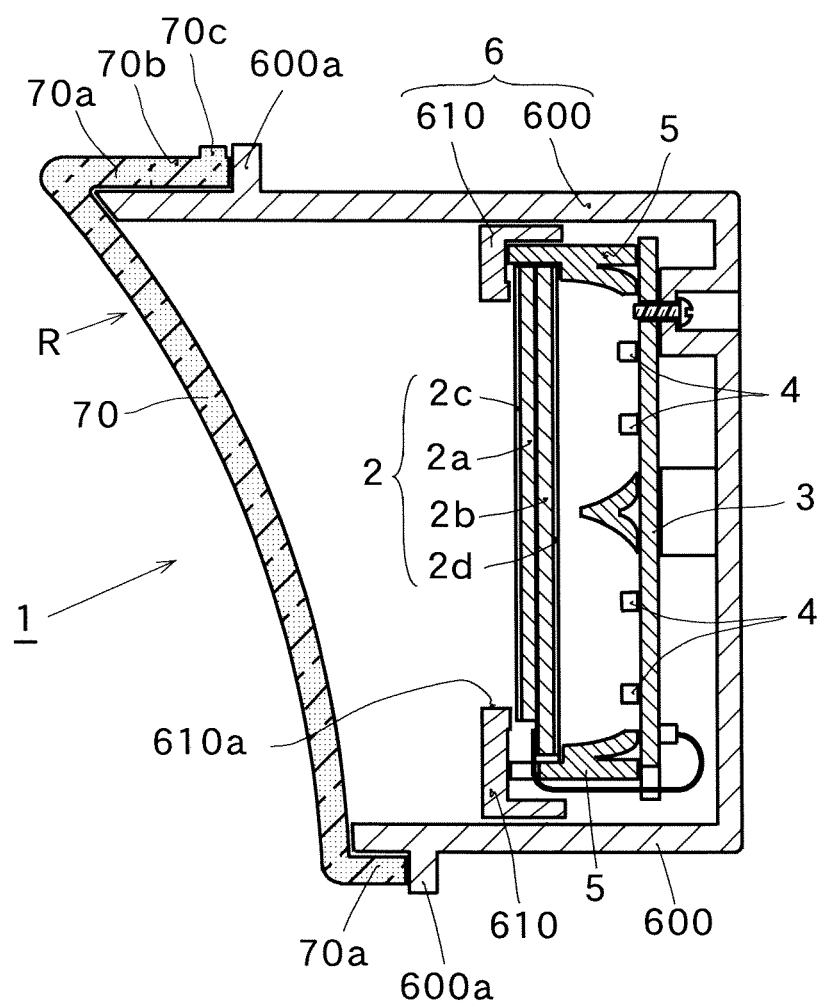
FIG. 6 An enlarged section view showing main portions in FIG. 4.
Figure 7:
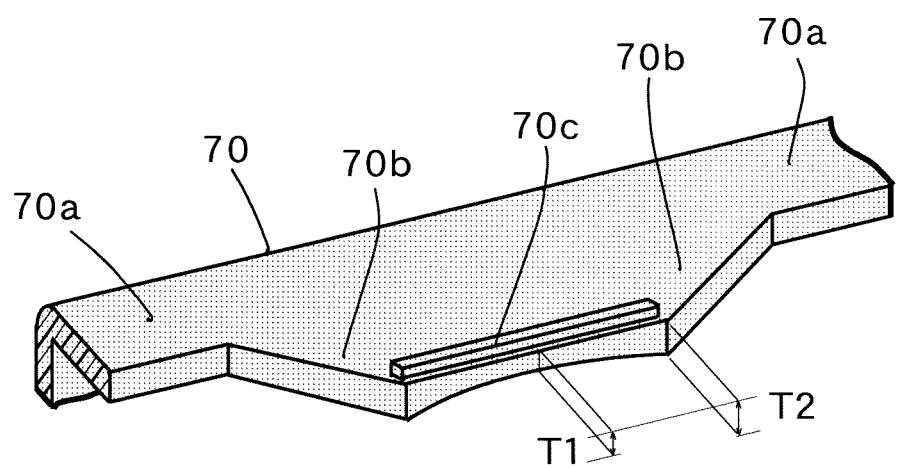
FIG. 7 An enlarged perspective view of main portions showing the position of a gate port provided for a see-through plate.

FIG. 1 to FIG. 3 show a first embodiment. A liquid crystal display device 1 of the present embodiment includes a liquid crystal display 2 having a liquid crystal sealed in between a pair of glass substrates 2a and 2b and also having polarizing plates 2c and 2d provided on a front side and a rear side of the glass substrate 2a and 2b, respectively, a circuit substrate 3 having a driving circuit 3a mounted thereon for driving the liquid crystal display 2, a light source 4 formed of a light-emitting diode or the like, mounted on the circuit substrate 3, and illuminating the liquid crystal display 2 for realizing display, a holder 5 holding the liquid crystal display 2 and the circuit substrate 3, a casing 6 housing the liquid crystal display 2, the circuit substrate 3, and the holder 5, and a see-through plate 7 made, for example of acrylic resin, covering an opening portion on the front of the casing 6, protecting the polarizing plate 2c placed on the front side of the liquid crystal display 2, preventing entry of dust from the outside to the inside of the casing 6, and provided with an area for allowing visual recognition of a display portion area of the liquid crystal display 2.

The casing 6 in the present embodiment is formed of a casing member 60 housing the liquid crystal display 2, the circuit substrate 3, and the holder 5, and a casing member 61 in hood form placed on a front side of the casing member 60 and provided with an opening portion 61a for visual recognition of the display portion area of the liquid crystal display 2. The see-through plate 7 made of acrylic resin described above is provided on a front side of the casing member 61 in hood form which constitutes part of the casing 6.

The see-through plate 7 is provided with a side wall 7a extending continuously in a direction substantially orthogonal to the area for visually recognizing the liquid crystal display 2 so as to surround the outside of an end portion of an opening portion on the front of the casing 6 (the casing member 61 in hood form). The side wall 7a has a protruding portion 7b at a position located at a distance from the area for visually recognizing the liquid crystal display 2. A gate port 7c in resin molding of the see-through plat 7 is provided at the position of the protruding portion 7b.

In the present embodiment, the protruding portion 7b of the side wall 7a provided with the gate port 7c has a generally trapezoidal shape tapered with the gate port 7c as a base point, as shown in FIG. 1 and FIG. 2.

The area for visually recognizing the liquid crystal display 2 on the front side of the see-through plate 7 is formed in an arc curved shape R so that an observer is not confused when the observer visually recognizes the liquid crystal display 2 from the front side.

The casing member 61 has a dust-preventative rib 61b integrally provided to protrude at a position opposite to the end face of the side wall 7a of the see-through plate 7 so as to prevent entry of dust from between the casing member 61 in hood form constituting part of the casing 6 and the see-through plate 7.

In the liquid crystal display according to the first embodiment configured in this manner, display contents (display information) on the liquid crystal display 2 are illuminated transmissively from behind by light from the light source 4. Since the front side of the see-through plate 7 located at a position at a distance from the gate port 7c of the see-through plate 7 has no anisotropy of refractive index due to molding (no limitation in direction), the light passes through the front side as it is, and the display contents on the liquid crystal display 2 can be visually recognized favorably even when it is seen through polarizing glasses.

When the display contents on the liquid crystal display 2 are attempted to be checked through the polarizing glasses, the gate port 7c is provided at the position of the protruding portion 7b at the position of the side wall 7a of the see-through 7 at a distance from the visible range of the liquid crystal display 2 and thus the refractive index is anisotropic only near the gate port 7c due to the molding stress produced in molding since, and as a result, the areas partially appearing black are only the protruding portion 7b and the side wall 7a of the see-through plate 7 coinciding with a direction orthogonal to the polarization axis of the polarizing glasses when viewed through the polarizing glasses. However, the other area or the front side of the see-through plate 7 which is the area for visually recognizing the liquid crystal display 2 at the position at a distance from the gate port 7c has no anisotropy of refractive index due to the molding as described above (no limitation in direction), so that the light passes as it is, and the display contents on the liquid crystal display 2 can be favorably read and understood even when they are seen through the polarizing glasses.

In the present embodiment, the protruding portion 7b formed to protrude from the side wall 7a provided with the gate port 7c is formed in the generally trapezoidal shape tapered with the gate port 7c as the base point. The formation of the protruding portion 7b of the side wall 7a of the see-through plate 7 in the generally trapezoidal shape tapered with the gate port 7c as the base point allows favorable resin fluidity in the molding of the synthetic resin material. As a result, the molding stress in the resin molding can be relieved to reduce the size of the area having anisotropy of refractive index due to the molding stress.

The generally trapezoidal shape tapered around the gate port 7c can reduce the size of the area under the molding stress in the resin molding. When the display is seen through the polarizing glasses, the portion partially appearing black is only the narrow area (the area under the molding stress in the molding) of the side wall 7a of the see-through plate 7 coinciding with the direction orthogonal to the polarization axis of the polarizing glasses, so that the depth dimension of the side wall 7a can be reduced.

The area for visually recognizing the liquid crystal display 2 on the front side of the see-through plate 7 is formed in the arc curved shape R to prevent confusion when the observer visually recognizes the liquid crystal display 2 from the front side. Even when external light is incident on the front side of the liquid crystal display 2 from the outside, the light rays are reflected on the see-through plate 7 and then reflected in a horizontal direction (other than a line-of-vision direction) without returning to the line-of-vision direction because of the curved shape R of the arc shape, the display contents on the liquid crystal display 2 can be favorably recognized without confusion.

The casing 6 has the dust-preventative rib 61b integrally provided to protrude at the position opposite to the end face of the side wall 7a of the see-through plate 7. Even when dust is to enter from the end side of the side wall 7a of the see-through 7, the dust-preventative rib 61b formed to protrude from the casing 6 can block the dust.

Specifically, the dust-preventative rib 61b provided opposite to the end face of the side wall 7a of the see-through plate 7 integrally with the casing member 61 in hood form can prevent dust from entering from the gap portion serving as the boundary between the side wall 7a provided for the see-through plate 7 and the casing member 61.

Embodiment 2

FIG. 4 to FIG. 7 shows a second embodiment of the present invention. Components identical to or equivalent to the components described in the first embodiment are designated and described with the same reference numerals.

In FIG. 4 to FIG. 7, substantially similarly to the first embodiment, a liquid crystal display device 1 has a liquid crystal display 2, a circuit substrate 3 having a light source 4 mounted thereon, and a holder 5 which are housed in a casing 6, and also has a see-through plate 70 made, for example of acrylic resin, covering an opening portion on the front of the casing 6, protecting a polarizing plate 2c placed on a front side of the liquid crystal display 2, preventing entry of dust from the outside to the inside of the casing 6, provided with an area for visually recognizing a display portion area of the liquid crystal display 2.

The casing 6 in the present embodiment is formed of a casing member 600 housing the liquid crystal display 2, the circuit substrate 3, and the holder 5, and a casing member 610 in frame form placed on a front side of the liquid crystal display 2 housed in the casing member 600, closing the gap portion between the outside of the display area of the liquid crystal display 2 and an inner wall portion of the casing member 600, provided with an opening portion 610a for visual recognition of the display portion area of the liquid crystal display 2. The see-through plate 70 made of acrylic resin described above is provided on a front side of the casing member 600 which constitutes part of the casing 6.

The casing member 600 has a dust-preventative rib 600a integrally provided to protrude at a position opposite to the end face of the side wall 70a of the see-through plate 70 so as to prevent entry of dust from between the casing member 600 and the see-through plate 700.

In the present embodiment, substantially similarly to the first embodiment described above, a protruding portion 70b formed to protrude from the side wall 70a provided with the gate port 70c has a generally trapezoidal shape tapered with the gate port 70c as a base point. In addition, in the present embodiment, the thickness dimensions of the gate port 70c are formed such that the central portion is formed as a thin portion T1 and both end portions of the generally trapezoidal and tapered shape are formed as a thick portion T2. (See FIG. 7)

In the present embodiment, the see-through plate 70 is molded with coloring in a predetermined color by mixing black or brown pigments.

In the liquid crystal display according to the second embodiment configured in this manner, substantially similarly to the first embodiment, display contents (display information) on the liquid crystal display 2 are illuminated transmissively from behind by light from the light source 4. Since the front side of the see-through plate 70 located at a position at a distance from the gate port 70c of the see-through plate 7 has no anisotropy of refractive index due to molding (no limitation in direction), the light passes through the front side as it is, and the display contents on the liquid crystal display 2 can be visually recognized favorably even when it is seen through polarizing glasses.

In the present embodiment, since the protruding portion 70b formed to protrude from the side wall 70a provided with the gate port 70c is formed in the generally trapezoidal shape tapered with the gate port 70c as the base point, and the thickness dimensions of the gate port 70c are formed such that the central portion is formed as the thin portion T1 and both end portions of the generally trapezoidal and tapered shape are formed as the thick portion T2, the generally trapezoidal shape tapered with the gate port 70c as the base point allows favorable resin fluidity in the molding of the synthetic resin material substantially similarly to the first embodiment described above. As a result, the molding stress in the resin molding can be relieved to reduce the size of the area having anisotropy of refractive index due to the molding stress. In addition, since the thickness dimensions of the gate port 70c are formed such that the central portion is formed as the thin portion T1 and both end portions are formed as the thick portion T2, the flow of the resin in the molding is enhanced on both sides as compared with the central portion to allow uniform flow over the entire see-through plate 7 in the resin molding.

Thus, the resin fluidity in the molding of the synthetic resin material can be enhanced and the flow in the resin molding can be uniformalized. As a result, the molding stress can be relieved to reduce the size of the area where the orientation direction of the resin molecules is nonuniform. This can widen the area with the proper orientation direction of the molecules in the resin molding relative to the polarization axis direction of the polarizing plate of the liquid crystal display.

Since the see-through plate 70 itself is molded with coloring in a predetermined color by mixing black or brown pigments, the color of the display portion of the liquid crystal display 2 transmitted through the see-through plate 70 is entirely illuminated through the color of the see-through plate 70, and the liquid crystal display 2 appears to be placed at a position behind the see-through plate 70, so that a sense of greater depth and a three-dimensional appearance can be enhanced. In addition, since the casing member 610 in frame form covering the outer peripheral portion of the liquid crystal display 2 is visually recognized through the colored see-through plate 70, only the liquid crystal display 2 appears to be isolated against a dark background. Thus, the liquid crystal display 1 with favorable appearance can be provided.

Similarly to the first embodiment described above, since the see-through plate 70 is formed in the arc curved shape R, light rays are reflected on the see-through plate 70 and then reflected in the horizontal direction other than the line-of-vision direction without returning to the line-of-vision direction, so that the display contents on the liquid crystal display 2 can be favorably recognized. In addition, the casing 600 has the dust-preventative rib 600a integrally provided to protrude at the position opposite to the end face of the side wall 70a of the see-through plate 70. Even when dust is to enter from the end portion of the side wall 70a of the see-through 70, the dust-preventative rib 600a formed to protrude from the casing 600 can block the dust.

The present invention is not limited to the embodiments described above, and various modification can be made without departing from the spirit or scope of the present invention. For example, the protruding portions 7b and 70b formed to protrude from the side walls 7a and 70a located on the upper side of the see-through plates 7 and 70 are formed in the generally trapezoidal shapes in the embodiments described above. They are not limited to the generally trapezoidal shape but an arc protruding portion may be used. While the gate ports 7c and 70c are provided on the end portions of the protruding portions in the embodiments with respect to the position relationship to provide the gate ports 7c and 70c at the points of the protruding portions, the placement positions of the gate ports 7c and 70c are not limited to the end portions, and may be set to the central position in some cases. The depth and the width dimensions of the protruding portions 7b and 70b may be set depending on the depth dimensions of the side walls 7a and 70a provided for the see-through plates 7 and 70. The position for placing the gate ports 7c and 70c may be set as appropriate in accordance with the positions of the protruding portions 7b and 70b. While the acrylic resin is used as the synthetic resin material of the see-through plates 7 and 70 in the embodiments, another transmissive resin such as a polycarbonate resin can be used for the formation.

Industrial Applicability

As described in detail in the embodiments or the like described above, the liquid crystal display device has been described with the example of an indicator for a vehicle such as a car. However, the present invention is not limited to the indicator for vehicle but is applicable to an indicator for a ship, or an indicator for a special vehicle such as an agricultural machine and a construction machine, or a liquid crystal display provided for a remote-control operation panel of a water heater or the like, or a commercial device such as a videocassette recorder and an audio product.

DESCRIPTION OF REFERENCE NUMERALS AND SIGNS

R CURVED SHAPE
T1 THIN PORTION
T2 THICK PORTION
1 LIQUID CRYSTAL DISPLAY DEVICE
2 LIQUID CRYSTAL DISPLAY
2a, 2b GLASS SUBSTRATE
2c, 2d POLARIZING PLATE
3 CIRCUIT SUBSTRATE

3a DRIVING CIRCUIT
4 LIGHT SOURCE (LIGHT-EMITTING DIODE)
5 HOLDER
6 CASING
7 SEE-THROUGH PLATE
7a SIDE WALL
7b PROTRUDING PORTION
7c GATE PORT
60 CASING MEMBER
61 CASING MEMBER IN HOOD FORM
61a OPENING PORTION
61b DUST-PREVENTATIVE RIB
70 SEE-THROUGH PLATE
70a SIDE WALL
70b PROTRUDING PORTION
70c GATE PORT
600 CASING MEMBER
600a DUST-PREVENTATIVE RIB
610 CASING MEMBER IN FRAME FORM
610a OPENING PORTION

The invention claimed is:

1. A liquid crystal display device comprising a liquid crystal display including a polarizing plate provided on each of a front side and a rear side, a casing housing the liquid crystal display, and a see-through plate made of synthetic resin, covering an opening portion on a front of the casing, and provided for visual recognition of a display portion area of the liquid crystal display, characterized in that the see-through plate is provided with a side wall extending continuously from an area for visually recognizing the liquid crystal display so as to surround an outside of an end portion of the opening portion on the front of the casing, and the side wall is provided with a gate port in molding of a resin of the see-through plate at a position located at a distance from the area for visually recognizing the liquid crystal display.

2. The liquid crystal display device according to claim 1, characterized in that the side wall is provided with a protruding portion at a position located at a distance from the area for visually recognizing the liquid crystal display, and the gate port in molding of the resin of the see-through plate is provided at a position of the protruding portion.

3. The liquid crystal display device according to claim 2, characterized in that the protruding portion protruding from the side wall provided with the gate port is formed in a generally trapezoidal shape tapered with the gate port as a base point.

4. The liquid crystal display device according to any one of claims 1 to 3, characterized in that a dust-preventative rib is formed to protrude opposite to a position of an end portion of the side wall and integrally with the casing.

5. The liquid crystal display device according to claim 1, characterized in that the see-through plate is colored and molded.

6. The liquid crystal display device according to claim 1, characterized in that the area for visually recognizing the liquid crystal display on the front side of the see-through plate is formed in an arc curved shape.

* * * * *